May 28, 1963 M. D. SANNER ET AL 3,091,755
STEPPER ANGLE-MEASURING DEVICE
Filed Sept. 11, 1959 4 Sheets-Sheet 1
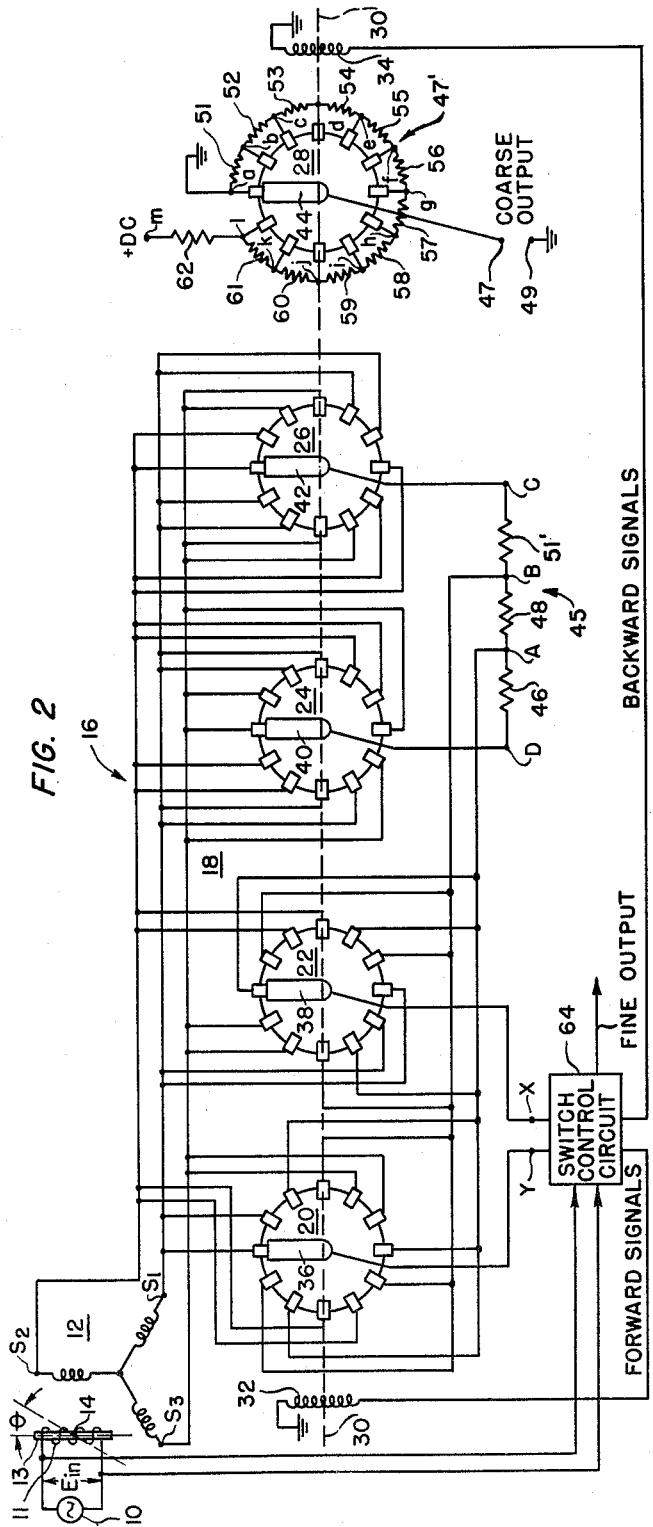
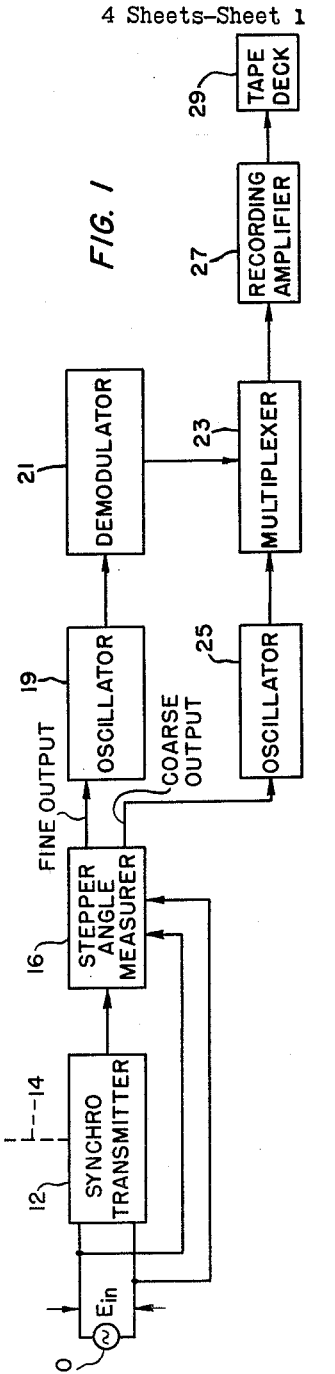
FIG. 1
FIG. 2
INVENTORS
MEDFORD D. SANNER
ROBERT O. COX
BY
ATTORNEY May 28, 1963   M. D. SANNER ET AL   3,091,755
STEPPER ANGLE-MEASURING DEVICE
Filed Sept. 11, 1959   4 Sheets-Sheet 2

INVENTORS
MEDFORD D. SANNER
ROBERT O. COX
BY
ATTORNEY

PHASE RELATIONSHIPS
NORMAL SEQUENCE

PHASE RELATIONSHIPS
INPUT REVERSED

INVENTORS
MEDFORD D. SANNER
ROBERT O. COX
BY
ATTORNEY

FIG. 7

| POSITION | STATOR CONNECTIONS S₁ | STATOR CONNECTIONS S₂ | STATOR CONNECTIONS S₃ | TAP CONNECTIONS A | TAP CONNECTIONS B | ANGLES COVERED |
|---|---|---|---|---|---|---|
| 1 | Y | C | D | X | — | 0° TO 30° |
| 2 | Y | C | D | — | X | 30° TO 60° |
| 3 | D | X | C | Y | — | 60° TO 90° |
| 4 | D | X | C | — | Y | 90° TO 120° |
| 5 | C | D | Y | X | — | 120° TO 150° |
| 6 | C | D | Y | — | X | 150° TO 180° |
| 7 | X | C | D | Y | — | 180° TO 210° |
| 8 | X | C | D | — | Y | 210° TO 240° |
| 9 | D | Y | C | X | — | 240° TO 270° |
| 10 | D | Y | C | — | X | 270° TO 300° |
| 11 | C | D | X | Y | — | 300° TO 330° |
| 12 | C | D | X | — | Y | 330° TO 360° |

SWITCHING SEQUENCE

INVENTORS
MEDFORD D. SANNER
ROBERT O. COX

United States Patent Office 3,091,755
Patented May 28, 1963

3,091,755
STEPPER ANGLE-MEASURING DEVICE
Medford D. Sanner and Robert O. Cox, Fort Worth, Tex., assignors to General Dynamics Corporation, San Diego, Calif., a corporation of Delaware
Filed Sept. 11, 1959, Ser. No. 839,318
5 Claims. (Cl. 340—187)

This invention relates to apparatus for measuring angular displacements of movable members, such as shafts, or more particularly to apparatus which measures the angular displacement of synchro transmitter input shafts by accurately measuring the electrical outputs of synchro transmitters.

Heretofore apparatus which measured angular displacement of rotatable shafts had numerous disadvantages. In such apparatus the components generally used, involved conventionally connected synchro transmitter and motor systems, wherein angular rotation of the input shaft of the transmitter synchro was reproduced by the output shaft of the synchro motor. Electrical outputs corresponding to the angle of rotation of the input shaft were produced by potentiometer circuits connected to the output shaft. The accuracy achieved with such apparatus was extremely poor, particularly since the degree of accuracy depended on the exactness of mechanical tolerances between the movable and stationary parts of the synchro transmitter and motor systems. This dependence of accuracy on exactness of tolerances in turn created problems of miniaturization of equipment and rapidly rising cost with increased desired accuracy.

In addition to the problems outlined above, encountered in previous measuring devices, other disadvantages were that of complexity, the presence of dynamic error due to shaft rotation, undesirable weight and relatively high power consumption. Moreover, the degree of loading introduced by previous devices to other circuitry used in conjunction therewith was a decided disadvantage, which could only be solved by still greater increase of complexity of construction, as for example, by employing load isolation amplifiers with stable and matched gains.

In certain aircraft navigation installations, previous measuring devices of poor accuracy used two speed synchro transmitter and motor systems adapted to operation with a ratio of 27:1 between the fine and coarse synchro systems. In apparatus of this type the fine synchro system makes 27 turns for one complete revolution of the coarse synchro system, thus making one revolution of the fine synchro system equivalent to 13⅓ degrees of the electrical angle to be measured. In such devices the fine synchro angle displacement is measured to an accuracy of only one degree of displacement, and having knowledge of which 13⅓ degree segment the fine synchro system is in, defines the angle to be measured to an accuracy of only one part in 9,780. A desirable accuracy of measurement of the electrically defined angles is one minute of arc, or one part in 21,600. It is readily apparent that the discrepancy between the accuracy obtainable by previous devices varies greatly from that desired.

By employing more nearly an all electrical apparatus and providing means which accurately measures the output of synchro transmitters, without resorting to duplication of the input shaft angle by the output shaft of the synchro motor, the present invention overcomes the disadvantages of the previous measuring devices. The present invention provides for a reduction in the number and precision of relatively movable parts and thus allows for a greater degree of miniaturization than heretofore obtainable by prior devices. Furthermore, there is a saving in construction time and cost as well as savings due to the use of relatively low cost components. Electrically, the apparatus of the present invention provides a high input impedance to other associated circuitry. Dynamic errors are greatly reduced because no input shaft repetition by the output shaft of previous devices is necessary.

Generally, in the present invention, apparatus is provided which measures the angular displacement of an input shaft of a synchro transmitter by converting the output of the synchro transmitter into a pair of electrical outputs accurately defining the angular position of the input shaft. One of the outputs, which is called the fine output, represents, with great accuracy, movement of the shaft within predetermined angular segments, and the second output, which is called the coarse output, represents the predetermined angular segments. More particularly, the fine signal output consists of a series of voltage sweeps for each complete revolution of the input shaft, each sweep defining movement of the shaft within one of the predetermined angular segments. The voltage sweeps are linear and vary from a minus peak value, through a null, to a plus peak value when the input shaft rotates in one direction, and vary from a peak positive value, through a null, to a peak negative value when the input shaft rotates in the opposite direction. On the other hand, the coarse output consists of D.C. step voltages, each voltage representing one of the predetermined angular segments. The D.C. step voltages are twelve in number for a complete revolution of the input shaft and occur at 30° intervals.

An object of this invention is to provide a system for measuring the angular displacements of movable members.

Another object of the present invention is to provide a system for electrically measuring the angular displacement of a synchro transmitter input shaft.

A further object of the present invention is to provide a system which electrically measures the angular displacement of a synchro transmitter input shaft by converting the output of the synchro transmitter to a pair of electrical outputs which accurately indicate the angular displacement of the input shaft within a predetermined angular segment of rotation and identify the predetermined angular segment.

A final object of the present invention is to provide a system which electrically measures the angular displacement of a synchro transmitter input shaft by converting the output of the synchro transmitter to a pair of electrical outputs, one of which consists of a series of linear sweep voltages which define movement of the shaft within predetermined angular segments and the other identifies the predetermined angular segment.

Other objects and features of the present invention will be readily apparent to those skilled in the art from the following specification and appended drawings wherein is illustrated a preferred form of the invention and in which:

FIGURE 1 is a block diagram of the system incorporating the invention;

FIGURE 2 is a schematic circuit diagram, partly in block, of a portion of the system of FIGURE 1;

Figure 5:
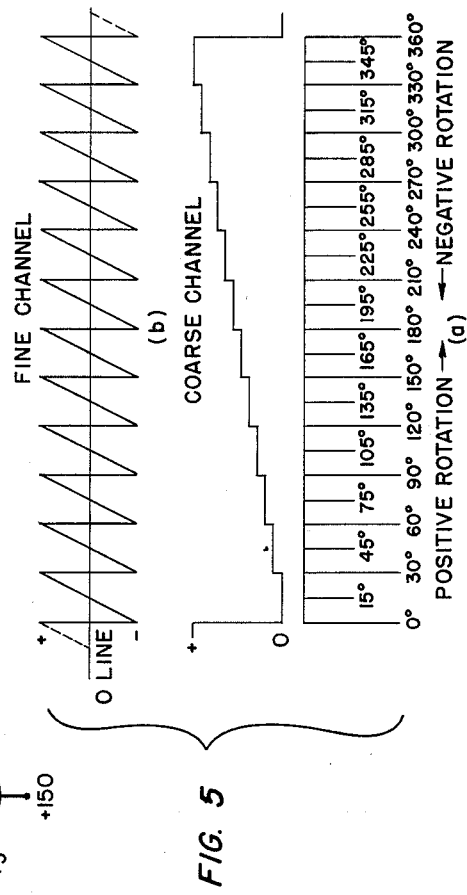
Figure 4A:
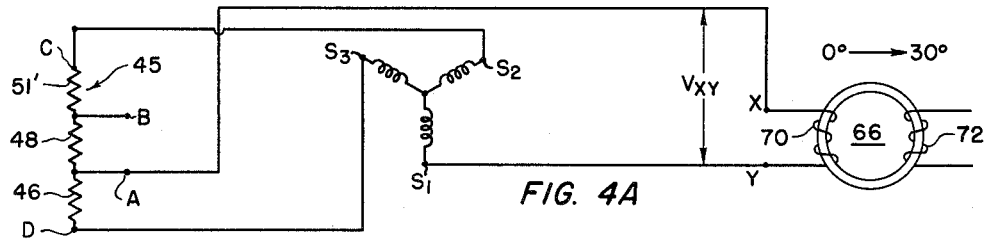
Figure 4B:
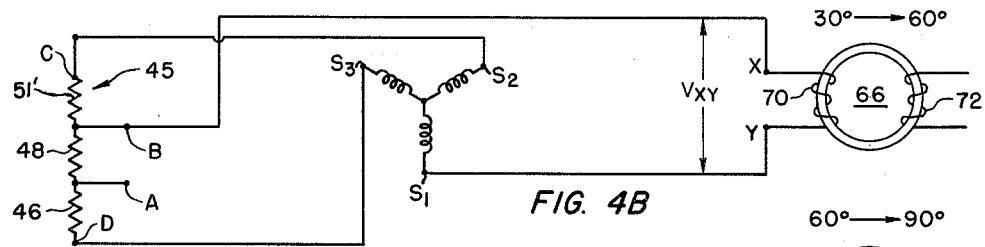
Figure 4C:
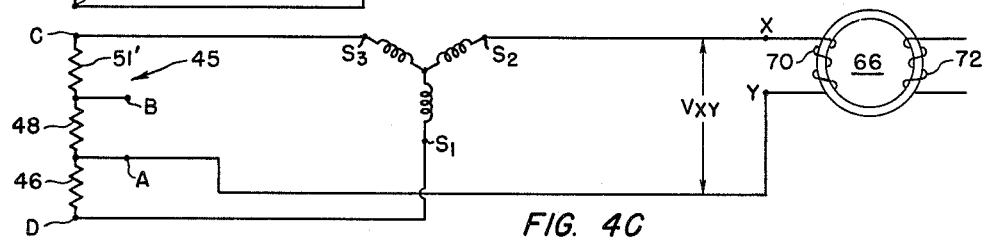
Figure 6A:
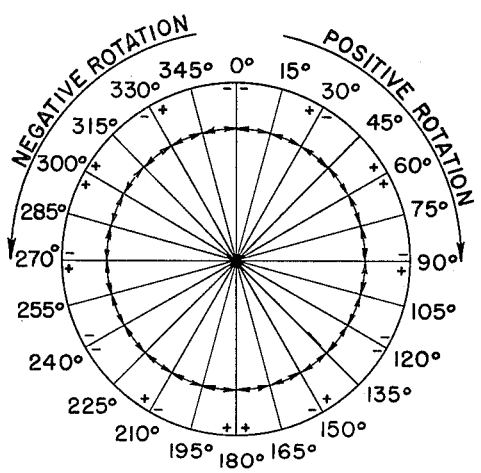
Figure 6B:
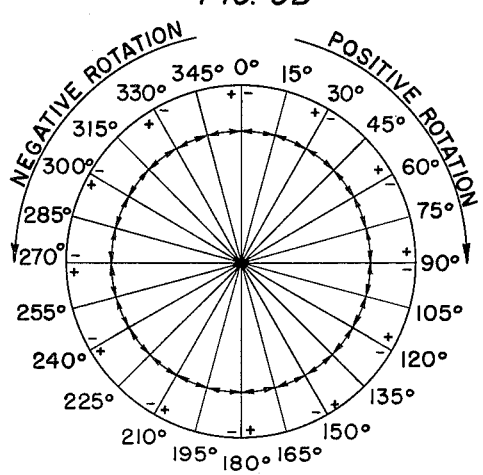

FIGURES 4(a), 4(b) and 4(c) are simplified schematic diagrams showing the sequence of switching between certain terminals of components of FIGURE 2 as the input shaft rotates;

FIGURE 5, parts (a) and (b), show graphically, voltage outputs obtained in certain portions of the circuit of FIGURE 2 due to rotation of the input shaft in the positive or negative directions;

FIGURES 6(a) and 6(b) show the phase relationships of the sweep voltage outputs which would be obtained if no reversal of input was provided in the fine channel of FIGURE 2, and the phase relationship of the sweep voltage outputs actually obtained with reversal of input to the fine channel, respectively; and FIGURE 7 shows the switching sequence of the device of the present invention.

Referring now to the drawings and in particular to FIGURE 1, there is shown a block diagram of the system incorporating the present invention as having a voltage source 10 for providing a reference voltage $E_{in}$ to the rotor winding of synchro transmitter 12 whose rotor is adapted to be connected to the input shaft 14, whose angular displacement is to be measured. A stepper angle measurer 16, to be more fully described hereinafter, is connected to the stator terminals $S_1$, $S_2$, and $S_3$ of the transmitter 12 to provide the separate fine and coarse outputs, hereinbefore mentioned. An oscillator 19 receives the fine output to be modulated thereby. The modulated signal from the oscillator 19 is then fed to a demodulator 21 which demodulates the signal and passes it to a multiplexer 23 to be mixed therein with the coarse output. The coarse output from stepper angle measurer 16 also modulates an oscillator 25 which feeds the modulated signal to the multiplexer 23. The multiplexed fine and coarse outputs are then fed to a recording amplifier 27 and then to the tape deck 29 for recordation.

Referring now to FIGURE 2, there is revealed the detailed connections of the synchro transmitter 12 and the stepper angle measurer 16. The reference voltage source 10 is shown as being connected to the winding 11 which is wound on the rotor 13 of the synchro transmitter 12. The rotor 13 is connected to and adapted to rotate with the input shaft 14, whose angular displacement $\theta$ is to be measured. It is readily apparent that as the rotor 13 rotates, an output is produced at the stator terminals $S_1$, $S_2$, and $S_3$ of the transmitter.

In order to convert the synchro transmitter output to sweep voltages in the fine channel and to obtain simultaneous D.C. step voltages in the coarse channel, the stepper angle measurer 16 is provided with an arrangement which includes a rotary switch unit 18, a fine divider network 45, a coarse divider network 47, and a switch control circuit 64.

The rotary switch unit 18 is shown as being a stepper switch arrangement having a plurality of individual switches 20, 22, 24, 26 and 28, all actuated by a common shaft 30. The shaft 30 is adapted to be rotated in either the forward direction by energization of a drive coil 32, or in the backward direction by energization of drive coil 34, depending on the signals produced by the switch control unit 64, to be more fully described hereinafter. The switches 20, 22, 24, 26 and 28 are provided with movable contacts 36, 38, 40, 42 and 44, respectively, which are mounted on shaft 30 for rotation therewith. Each switch is also provided with a plurality of stationary contacts, twelve in number, equally spaced on the switch, and adapted to be engaged in electrical contact by the movable contact of the switch as the shaft 30 rotates.

The fine divider network 45 consists of a plurality of resistors 46, 48, and 51, all arranged in series, with the two end resistors 46 and 51 being of equal resistance and the middle resistor 48 being equal to $\sqrt{3}$ times the resistance of one of the end resistors. Connection points A, B, C and D are also provided on the fine divider network for connection to the switches 20, 22, 24 and 26, to be more fully described hereinafter.

The coarse divider network 50 consists of a plurality of resistors 51–62 of equal resistance, arranged in series connection. A plurality of connection points a–m are provided on the network for connection to the switch 54, as will be more fully described hereinafter.

Figure 3:
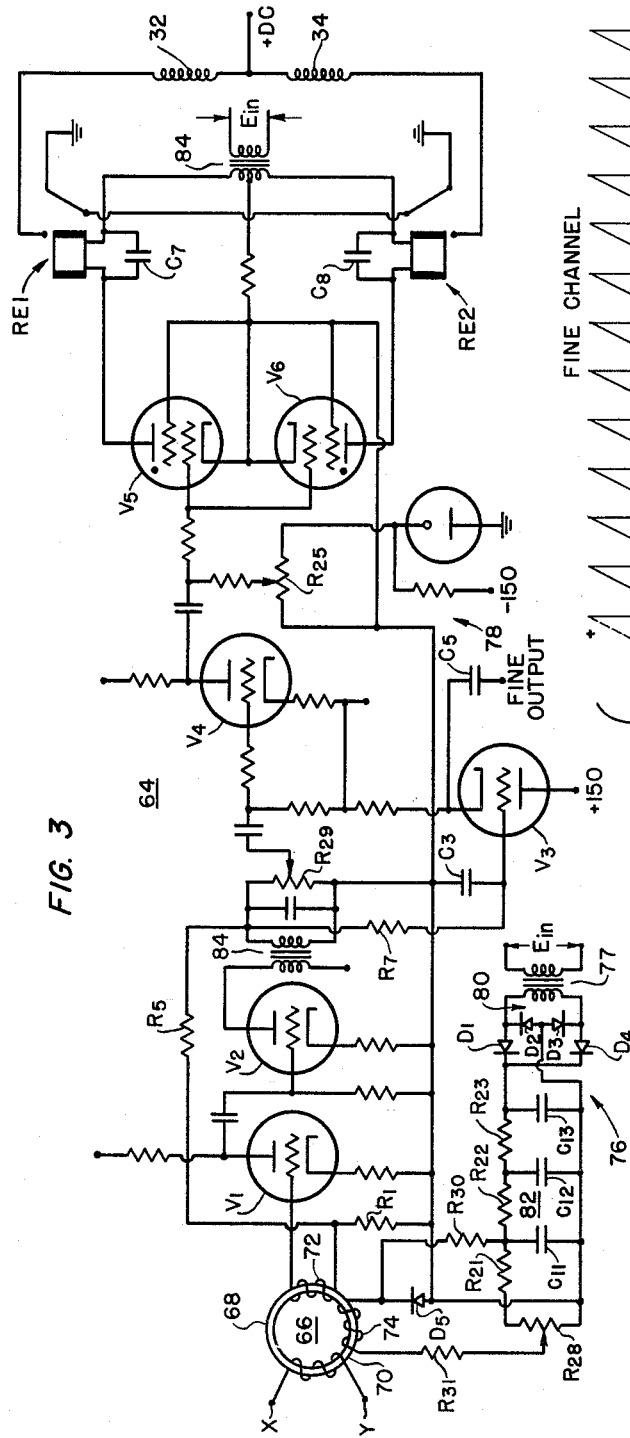
FIGURE 3 is a schematic circuit diagram of a portion of the circuit of FIGURE 2.

The switch control circuit 64, best shown in FIGURE 3, consists generally of an isolator or input transformer 66, a voltage regulator 76 and a phase and amplitude sensitive circuit 78. The isolator or input transformer 66 is shown as having a toroidal iron core 68, a primary winding 70 with input terminals X and Y, whose connection with the rest of the apparatus will hereinafter be more fully described, and a secondary winding 72 connected to the phase and amplitude sensitive circuit 78. A third or control winding 74 is connected to the voltage regulator 76 for a purpose to be hereinafter more fully set forth.

Since the accuracy of measurement depends, to a great degree, on the stability of the reference voltage $E_{in}$, compensation for any increase or decrease of this voltage is provided for in the form of a voltage regulator 76. The voltage regulator 76 consists of a transformer 77 having its primary winding connected to the source 10 which provides the reference voltage $E_{in}$. The secondary winding of the transformer 77 is connected to a bridge type rectifier 80 consisting of diodes $D_1$, $D_2$, $D_3$, and $D_4$ for providing a D.C. current which is filtered by a filter network 82 consisting of resistors $R_{21}$, $R_{22}$, $R_{23}$ and the capacitors $C_{11}$, $C_{12}$ and $C_{13}$. One end of the control winding 74 is connected through a variable resistor $R_{28}$ and fixed resistor $R_{31}$ to the output of the filter network 82, the other end of the control winding being connected to the filter network through diode $D_5$. The control winding 74 causes the isolator or input transformer 66 to behave as a saturable reactor regulator when the winding is excited by a D.C. current which is a function of the reference voltage $E_{in}$. When the voltage $E_{in}$ increases in magnitude, a corresponding increase in the D.C. current occurs. The increase in the D.C. current drives the core 68 of the transformer 66 toward saturation which decreases the effective inductance of the core windings 70 and 72. With decreasing inductance, hence decreasing primary impedance, less voltage appears across the primary winding 70. With a proper bias point selected by adjustment of variable resistor $R_{28}$, this decrease in inductance will balance the increase in the voltage applied to the input terminals X and Y caused by a rise in the reference voltage $E_{in}$. In a like manner, the result of a decrease in the reference voltage $E_{in}$ will be compensated for by an increase in the input impedance of the transformer 66.

The phase and amplitude sensitive circuit 78 includes a feedback stabilized amplifier portion consisting of two stages of amplification. The first stage consists of a triode $V_1$ having its grid connected to the secondary winding 72 and its plate to the grid of triode $V_2$, the second stage of amplification. The plate of $V_2$ is connected to the primary of a coupling device in the form of a transformer 84. Feedback for the amplifier portion is obtained by providing a series arrangement consisting of resistors $R_1$ and $R_5$ connected to the secondary winding of the transformer 84 and the control winding 74. The null error voltage output from the transformer 84 is passed through a phase corrective network including a resistor $R_7$ and capacitor $C_3$, which corrects for a 45° phase shift introduced by the preselected values of the circuit components constituting the fine divider network 45 and the input of transformer 66, and actuates the grid of a cathode follower tube $V_3$. This is necessary since the output signal from the cathode follower $V_3$ must be in phase with the reference voltage $E_{in}$ if successful demodulation is to be accomplished. The fine output is obtained from the cathode of cathode follower $V_3$ through capacitor $C_5$.

The remainder of the circuit 78 is concerned with the detection of the phase and amplitude of the input signal in order to instruct the rotary switch unit 18 both when and in which direction to switch. To accomplish the necessary switching, the output of transformer 84 is also fed to the grid of a triode amplifier $V_4$ wherein additional amplification of the output is obtained. The output of amplifier $V_4$ is used to fire either one of the thyratrons $V_5$ or $V_6$. The thyratron which is fired will depend upon the phase relationship existing between its grid and plate voltages. To this end a transformer 84 is supplied which has its primary winding connected to the source 10 which provides the reference voltage $E_{in}$. One end of the secondary winding is connected to the plate of $V_5$ and the other end is connected to the plate of $V_6$. A center tap of the secondary winding of the transformer 84 is connected to the commonly connected cathodes of $V_5$ and $V_6$. It is readily apparent that with an input voltage of $E_{in}$ to the primary of transformer 84, voltages which are 180° out of phase will be supplied to the plates of $V_5$ and $V_6$. Either the thyratron $V_5$ or $V_6$ will fire when the voltage on its grid is substantially in phase with the voltage on its plate and is of the proper magnitude. A reversal of the phase of the grid voltage will cause the opposite thyratron to fire. The firing point of the thyratrons is controlled by potentiometer $R_{25}$ which controls the grid bias voltage of both $V_5$ and $V_6$. Firing of a thyratron will cause either relay RE1 or RE2 to operate, completing the electrical circuit to the forward or reverse drive coils 32, 34 on the stepper switch 18. The stepper switch will then choose a circuit configuration from the switching function, to be hereinafter described, which will result in an error voltage below the value needed to fire one of the thyratrons $V_5$, $V_6$.

The detailed connections of the synchro transmitter 12, the rotary switch unit 18, the fine divider network 45, the coarse divider network 50, and the switch control circuit 64 will now be described.

Referring to switch 20, and starting with the top stationary contact and proceeding in a clock-wise direction, the order of stationary contact connection is: $S_1$, $S_1$, A, B, $S_3$, $S_3$, A, B, $S_2$, $S_2$, A and B. The movable contact 36 of switch 20 is permanently connected to the input terminal Y of the switch control circuit 64. Referring to switch 22, and starting with its top stationary contact and proceeding in the same clock-wise direction as with reference to switch 20, the order of stationary contact connection of the switch 22 is: A, B, $S_2$, $S_2$, A, B, $S_1$, $S_1$, A, B, $S_3$, and $S_3$. The movable contact 38 is connected to the input terminal X of switch control circuit 64. Referring to switch 24, the order of connection is: $S_3$, $S_3$, $S_1$, $S_1$, $S_2$, $S_2$, $S_3$, $S_3$, $S_1$, $S_1$, $S_2$ and $S_2$. The movable contact 40 is connected to C. Referring to switch 26, the order of connection is: $S_2$, $S_2$, $S_3$, $S_3$, $S_1$, $S_1$, $S_2$, $S_2$, $S_3$, $S_3$, $S_1$, and $S_1$. The movable contact 42 is connected to D. Referring now to switch 28, the order of connection of the stationary contacts is: $a$, $b$, $c$, $d$, $e$, $f$, $g$, $h$, $i$, $j$, $k$, and $l$. The connection point $a$ is also connected to ground on the negative terminal of a D.C. voltage source, and the point $m$ is connected to the positive terminal of the D.C. voltage source. The movable contact 44 is connected to one of the coarse output terminals 47, while the other output terminal 49 is connected to ground. It is readily apparent that the positioning of the movable contact 44 on one of the stationary contacts $a$, $b$, $c$, $d$, $e$, $f$, $g$, $h$, $i$, $j$, $k$, or $l$ provides a D.C. potential between the output terminals 47 and 49, which is a finite portion of the entire D.C. potential across the divider network 50.

The operation of the device can best be described by first assuming that the rotor 13 is in its 0° position and the movable contacts 36, 38, 40, 42 and 44 of the respective switches are positioned, as shown in FIGURE 2. Under these conditions, it is readily apparent that the stator legs $S_1$, $S_2$, and $S_3$ are in connection with the terminals Y, C and D, respectively, and the terminal A is connected to the terminal X. FIGURE 4(a) shows, in simpler form, these initial connections. It is also apparent that since the rotor 13 is stationary the voltages from leg $S_2$ to $S_3$ and from leg $S_2$ to $S_1$ are of equal magnitude and like phase such that no voltage is found between the legs $S_3$ and $S_1$ and consequently no voltage is expected or is to be found across the input terminals X and Y. Furthermore, since the movable contact 44 of the switch 28 is positioned on the stationary contact $a$, which is in turn connected to ground, no step voltage is found in the coarse output.

As the rotor 13 turns in the positive or clock-wise direction under the influence of the input shaft 14 between the 0° position and the 30° position, a fine output is produced which consists of a linear voltage sweep developed across the terminals X and Y. The voltage sweep has a maximum minus peak value at the instant the rotor leaves the 0° position, a null at the 15° position, and a maximum plus peak value at the instant of reaching the 30° position. Due to the preselected values of the circuit components constituting the fine divider network 45 and the input of transformer 66, a phase shift is introduced in the sweep voltage which leads the reference voltage $E_{in}$ by 45°. This condition is desirable since maximum sensitivity can be achieved in the switch control circuit 64 when the sweep voltage is 45° out of phase with the voltages on the plates of the thyratron $V_5$ and $V_6$. During this time the coarse output remains zero. FIGURE 5, parts (a) and (b) show graphically the sweep voltage produced in the fine output and the voltage in the coarse output during the travel of the rotor between the 0° position and the 30° position.

At the instant the rotor reaches the 30° position a peak positive voltage is produced across the input terminals X and Y of transformer 66. The output of transformer 66 is amplified by the three stages of amplification, $V_1$, $V_2$ and $V_4$, and is fed to the grids of thyratrons $V_5$ and $V_6$. Since the grid voltage is substantially in phase with the voltage applied to the plate of thyraton $V_5$, except for the 45° phase difference introduced by the circuit components for maximum sensitivity, the thyratron $V_5$ fires and a current is produced in its plate circuit which serves to actuate relay RE1 which closes and allows a D.C. current to flow through drive coil 32 which actuates the stepper switch 18 to advance the movable contacts 36, 38, 40, 42 and 44 from their 0° positions, clock-wise, to their 30° positions. The circuit connections of stator legs $S_1$, $S_2$, $S_3$, the fine divider 45 and the transformer 66 are now as shown in FIGURE 4(b).

Continued rotation of the rotor 13 beyond the 30° position and to the 60° position produces a similar voltage sweep across the terminals X and Y, and a D.C. step voltage, as shown in FIGURE 5, parts (a) and (b). When the rotor reaches the 60° position, thyratron $V_5$ fires again to advance the movable contacts 36, 38, 40, 42 and 44 to the third or 60° position to define a new circuit configuration as shown in FIGURE 4(c). It is to be noted that this configuration calls for a reversal of the input to transformer 66. This is necessary in order to maintain the same phase relationship between the voltage sweeps for the same direction of rotation. FIGURE 6(a) shows the sweep voltage phase relationships that would be obtained without reversal of the input to the transformer 66, and FIGURE 6(b) indicates the phase relationships which are actually obtained by reversal of the transformer input at appropriate switch points. The input reversals take place at 0°, 60°, 120°, 180°, 240°, and 300°.

Continued rotation of the rotor 13 beyond the 60° position again produces a voltage sweep across the terminals X and Y. Similarly at the 90° position a new circuit configuration is selected, as shown in FIGURE 7, wherein there is set forth the entire switching sequence for one complete revolution of the synchro transmitter rotor in the positive or clock-wise direction.

Assuming now that the rotor 13 rotates in the negative or counter clock-wise direction from the 0° or 360° position, the voltage sweeps in the fine channel will vary from a peak positive value, through a null, to a peak negative value, and the coarse output will be a series of D.C. step voltages starting with a maximum D.C. voltage designating the angular segment from 360° to 330° to a minimum voltage designating the angular segment from 30° to 0°, as shown in FIGURE 5, parts (a) and (b). As in the rotation of the rotor hereinbefore described in the positive direction, the phase relationships between the sweep voltages in the negative direction of rotation are apparent from FIGURE 6(b). The switching sequence can also be determined from the chart of FIGURE 7 if the positions are read from bottom to top.

It is readily apparent that a device has been provided in the present invention which accurately tracks and measures synchro transmitter rotor movements when actuated by an input shaft, and while a certain preferred embodiment of the invention has been specifically disclosed, it is to be understood that the invention is not limited thereto as many variations will be readily apparent to those skilled in the art and the invention is to be given its broadest possible interpretation within the terms of the appended claims.

What is claimed is:

1. Apparatus for measuring angular rotation of a rotatable member comprising synchro transmitter means having a rotor driven by said rotatable member, the winding of said rotor being energized by a source of alternating voltage, and a stator with three stator terminals, a pair of input terminals, voltage divider means having taps thereon, switch means for establishing any one of a plurality of simultaneous connections of said voltage divider means between two stator terminals of said synchro transmitter means, one of said taps to one of said input terminals, and the other stator terminal of said synchro transmitter means to the other of said input terminals, said connections representing a plurality of predetermined angular segments through which said rotatable member moves, said taps being so spaced along said voltage divider means as to provide a first signal across said input terminals representing movement of said rotatable member in either direction within and from any one of said plurality of predetermined angular segments, switch control means connected to said input terminals and responsive to said first signal for producing a control signal to actuate said switch means to establish another of said connections as said rotatable member moves in either direction from any one of said plurality of predetermined angular segments to another, said switch control means comprising means for providing an output channel for said first signal, and means operatively connected to said switch means for producing a second signal representing the angular segments within which said rotatable member moves.

2. Apparatus for measuring angular rotation of a rotatable member comprising synchro transmitter means having a rotor driven by said rotatable member, the winding of said rotor being energized by a source of alternating voltage, and a stator with three stator terminals, a pair of input terminals, a plurality of resistor elements connected in series arrangement and having taps at the junctions thereof, switch means for establishing any one of a plurality of simultaneous connections of said series arrangement between two stator terminals of said synchro transmitter means, one of said taps to one of said input terminals, and the other stator terminal of said synchro transmitter means to the other of said input terminals, said connections representing a plurality of predetermined angular segments through which said rotatable member moves, said resistor elements having such resistive values as to provide a first signal across said input terminals representing movement of said rotatable member in either direction within and from any one of said plurality of predetermined angular segments, switch control means connected to said input terminals and responsive to said first signal for producing a control signal to actuate said switch means to establish another of said connections as said rotatable member moves in either direction from any one of said plurality of predetermined angular segments to another, said switch control means comprising means for providing an output channel for said first signal, and means operatively connected to said switch means for producing a second signal representing the angular segments within which said rotatable member moves.

3. Apparatus for measuring angular rotation of a rotatable member comprising synchro transmitter means having a rotor driven by said rotatable member, the winding of said rotor being energized by a source of alternating voltage, and a stator with three stator terminals, a pair of input terminals, three resistor elements connected in series arrangement to provide a pair of junctions therebetween having taps thereon, and end terminals, switch means for establishing any one of a plurality of simultaneous connections of said end terminals to two stator terminals of said synchro transmitter means, one of said taps to one of said input terminals, and the other stator terminal of said synchro transmitter means to the other of said input terminals, said connections representing a plurality of predetermined angular segments through which said rotatable member moves, the resistive value of the resistor element between said taps being $\sqrt{3}$ times the resistive value of each of the other resistor elements to provide a first signal across said input terminals representing movement of said rotatable member in either direction within and from any one of said plurality of predetermined angular segments, switch control means connected to said input terminals and responsive to said first signal for producing a control signal to actuate said switch means to establish another of said connections as said rotatable member moves in either direction from any one of said plurality of predetermined angular segments to another, said switch control means comprising means for providing an output channel for said first signal, and means operatively connected to said switch means for producing a second signal representing the angular segments within which said rotatable member rotates.

4. Apparatus for measuring angular rotation of a rotatable member comprising synchro transmitter means having a rotor driven by said rotatable member, the winding of said rotor being energized by a source of alternating voltage, and a stator with three stator terminals, a pair of input terminals, voltage divider means having taps thereon, switch means for establishing any one of a plurality of simultaneous connections of said voltage divider means between two stator terminals of said synchro transmitter means, one of said taps to one of said input terminals, and the other stator terminal of said synchro transmitter means to the other of said input terminals, said connections representing a plurality of predetermined angular segments through which said rotatable member moves, said taps being so spaced along said voltage divider means as to provide voltage sweeps across said input terminals representing movement of said rotatable member within and from any one of said plurality of predetermined angular segments, said voltage sweeps varying from a peak negative value through a null to a peak positive value when said rotatable member rotates in one direction, varying from a peak positive value through a null to a peak negative value when said rotatable member rotates in the other direction, switch control means connected to said input terminals and responsive to the peak positive and negative values of said voltage sweeps for producing a control signal to actuate said switch means to establish another of said connections as said rotatable member moves from any one of said plurality of predetermined angular segments to another, said switch control means comprising means for providing an output channel for said voltage sweeps, and means operatively connected to said switch means for producing signals representing the angular segments within which said rotatable member moves.

5. Apparatus for measuring angular rotation of a rotatable member comprising synchro transmitter means having a rotor driven by said rotatable member, the winding of said rotor being energized by a source of alternating voltage, and a stator with three stator terminals, a pair of input terminals, voltage divider means having taps thereon, switch means for establishing any one of a plurality of simultaneous connections of said voltage divider means between two stator terminals of said synchro transmitter means, one of said taps to one of said input terminals, and the other stator terminal of said synchro transmitter means to the other of said input terminals, said connections representing a plurality of predetermined angular segments through which said rotatable member moves, said taps being so spaced along said voltage divider means as to provide voltage sweeps across said input terminals representing movement of said rotatable member within and from any one of said plurality of predetermined angular segments, said voltage sweeps varying from a peak negative value through a null to a peak positive value when said rotatable member rotates in one direction, and varying from a peak positive value when said rotatable member rotates in the other direction, switch control means comprising transformer means connected to said input terminals for introducing a predetermined phase shift of said voltage sweeps with respect to said alternating voltage, phase and amplitude sensitive means connected to said transformer means and responsive to said voltage sweeps and said alternating voltage for producing a control signal to actuate said switch means to establish another of said connections as said rotatable member moves from one of said plurality of predetermined angular segments to another, and means connected to said transformer means for correcting said phase shift to provide an output channel for said sweep voltages, and D.C. voltage generating means operatively connected to said switch means for producing D.C. voltages representing the angular segments within which said rotatable member moves.

References Cited in the file of this patent

UNITED STATES PATENTS

| | | |
|---|---|---|
| 2,808,547 | Adler | Oct. 1, 1957 |
| 2,847,660 | Baldwin | Aug. 12, 1958 |
| 2,848,711 | Rhodes | Aug. 19, 1958 |
| 2,850,240 | Dickinson | Sept. 2, 1958 |
| 2,879,501 | Baran | Mar. 24, 1959 |
| 2,896,198 | Bennett | July 21, 1959 |